Patented Nov. 15, 1938

2,137,084

UNITED STATES PATENT OFFICE 2,137,084

PROTECTIVE COATING

Clarence L. Hauthaway, Newton, Mass.

No Drawing. Application November 25, 1936, Serial No. 112,837

2 Claims. (Cl. 134—54)

The present invention relates to protective coatings and is more particularly directed to rubber containing protective paints or coatings and containing an ingredient poisonous to destructive insects, parasites, and fungi.

The main constituents of the present composition are rubber, rubber-like solids, gums, resins, and plasticizers, a fluid solvent, and an oil soluble poison. Pigments may also be added to the composition.

In the preferred form of the composition, one part of a mixture of rubber and rubber-like solids to three parts of solvent are employed, the solvent having gums and plasticizers dissolved therein. It will be understood, however, that these proportions may be varied by persons skilled in the art.

The present coating composition also contains some vulcanizing agents and accelerating agents when desired. These are of a type that remain latent in the liquid coating composition, and become effective after the liquid coating has been applied and the solvent has evaporated. Vulcanization then proceeds more or less rapidly depending upon temperature conditions. Thus, when the coating is applied to a hot steam pipe, this vulcanization is rapid. On the other hand, when the coating is applied to pipes in a cold storage plant, the vulcanizaion of the present coating composition would proceed very slowly. In such cases additional very active vulcanizing agents and accelerators are stirred into the coating liquid immediately before it is applied.

The mixture of rubber and rubber-like solids consists preferably of approximately three parts of rubber and one part of rubber-like solids (such as gutta percha, balata, guttasiack, pontianac, synthetic esters and gums, etc.).

The process employed in the preparation of the present paint or coating composition will now be set forth in specific detail.

Rubber and rubber-like solids are milled together in proportions of about 75% rubber and 25% rubber-like solids. Two master batches are then prepared, one with the vulcanizing agent (such as sulphur or any other suitable vulcanizing agent) and the other with an accelerator (such as zinc oxide or any other suitable accelerator). The first master batch is prepared by milling together approximately 95% of the above mentioned mixture of rubber and rubber-like solids and 5% of sulphur. The second master batch is similarly prepared by milling together 95% of the mixture of rubber and rubber-like solids and 5% zinc oxide.

The rubber mass which is to constitute the base of the present paint composition is prepared by milling together 2½% or less of the first master batch, 2½% or less of the second master batch, and the remaining 95% or more, to make up the desired 100% of the milled mixture, of rubber and rubber-like solids. The amounts of the master batches employed depends upon whether it is desired to obtain a rigid, semi-rigid, or flexible coating. The higher the amount of vulcanizer and accelerator the greater the degree of vulcanization in the dried coating and the greater the rigidity of the coating. The vulcanizing agents and accelerator employed are of the type that remain latent in the liquid coating composition and do not become effective until the coating has dried.

To the rubber mass thus prepared or to the finished liquid paint just before applying, it may sometimes be desirable to add other accelerators when greater speed of vulcanization is desirable.

In some cases the milling operation is not effective in properly dispersing or intermingling the rubber and rubber-like solids. In such cases the method set forth in Patent No. 1,910,244 is employed. For present purposes, it is sufficient to outline briefly the process therein disclosed. The mass of rubber and rubber-like solids together with or without the desired vulcanizer and accelerator is mixed with resins which lower the melting point of the rubber. The mixture is heated to a state of fluidity. A soap forming acid, an alkali, and water are added successively with stirring and an aqueous dispersion of the rubber and rubber-like substances is formed. By means of this process the rubber and rubber-like solids become intimately intermingled in a finely divided state. For a more detailed description of the process, reference is made to Patent No. 1,910,244.

In the present process for the preparation of protective coating compositions, the dispersion as prepared in accordance with the teaching of the patent is further treated to throw the rubber and rubber-like solids, resins, etc., out of the dispersion. This is done either by excessive agitation as by a high speed beater or by adding a small amount of a suitable acid to cause the dispersion to coagulate or curdle. This mass is then separated from the liquids in the form of a pasty mass in which the rubber and rubber-like solids, resins, gums, etc., are distributed homogeneously in finely divided form. These, therefore, readily dissolve and disperse in the solvents employed to give a uniform product.

The mass of rubber and rubber-like solids, whether obtained by the milling operation or from the dispersion is now dissolved in naphtha or other petroleum solvents or in benzol, toluol, or other coal tar solvents. Resins, gums, and plasticizers are added to the solution. The amount of these gums and plasticizers may be varied over wide limits depending upon the degree of rigidity or flexibility desired in the final coating. Generally a preparation having roughly three parts of solvent in which are dissolved gums and plasticizers to one part of rubber and rubber-like solids may be used for most purposes. A poisonous ingredient, soluble in the vehicle employed, (such as naphtha, benzol, or toluol) and preferably copper oleate or copper resinate is now added to the composition. The toxic is added in amounts from 2% to 10% of the total content of the composition. If desired, however, the composition may carry larger quantities of poison and up to 60% without injuring the texture or solution of the other ingredients, so as to permit the user to dilute the preparation for use under such conditions where he desires a very thin and penetrating coating and is interested solely in protection against insects or the like.

Pigments may be added to the composition at this point if desired to render the film or coating more opaque and to improve its wearing qualities. The amount of pigment may vary from two to four pounds per gallon for giving the customary coverage.

Synthetic rubbers may be substituted in whole or in part for the natural rubber; likewise chlorinated rubber may also be used in whole or in part.

The composition obtained by the process described herein may be employed as a coating for wood, metal, concrete, rope, hose covering, belting, and a large variety of fabrics, and other structural or building materials. It will serve as an ornamental and protective coating against wear and exposure to the elements and in addition will also protect the material against the attacks of termites, crickets, grasshoppers, or other terrestrial borers or insects and from toredoes or other marine insects or growths. It will also protect the materials against mould, oxidation, action of acids and alkalies; and it will protect metals against electrolysis.

The method described herein permits the use of a great variety of rubber-like solids so as to produce hard or soft, flexible or rigid, transparent or opaque coatings as desired. These qualities may be obtained by the selection of the suitable rubber-like solids and by the selection of the kind and quantities of resins, gums, and plasticizers employed. The amount of vulcanizing agent also affects the flexibility of the final coating.

When pigment is employed, coverage and opacity are enhanced. The pigment particles also serve as nuclei for holding quantities of the rubber, and the resulting coating is considerably tougher than it would be without the pigment.

The film or coating obtained by the present composition has a smooth enamel-like surface and is highly resistant to acids, alkalies, and to extreme changes in temperature.

The present composition is light in weight as compared with hitherto known coating compositions, and the desired protection to parts of airplanes and the like may be had with considerable reduction in weight.

It is contemplated by means of the present invention to employ the present process in the production of a large variety of products for a variety of uses.

A coating composition for use solely to protect materials against attack by insects and fungi will contain the solvent, rubber and rubber-like products and a high percentage of the poisonous ingredient. This preparation may be diluted by the user so that the coating contains the desired percentage of poison.

For purposes where the surface may be exposed to considerable abrasion, or other wear such as exposure to the elements or the like, the composition will form a coating containing rubber and rubber-like solids partly or wholly vulcanized and resins, gums, and plasticizers, with or without the poisonous ingredient. These ingredients are varied for specific uses as has already been set forth.

The base of the present composition consisting of rubber and rubber-like solids, together with latent vulcanizer and accelerator dissolved or dispersed in finely divided form yields a tough, hard, smooth, adherent, and penetrating film which has a variety of uses, as a preservative of many types of surfaces against the elements, and acid fumes. In compositions prepared for such uses, the toxic ingredient may be eliminated.

The degree of vulcanization of the coating obtained by the present composition may be varied as desired. It is found, however, that for most general purposes about 75% vulcanization gives satisfactory results. Such degree of vulcanization is obtained by the use of the proportions of the first and second master batches as set forth in the earlier portion of this specification.

I claim:

1. The method of preparing a liquid coating composition comprising the steps of intimately intermingling rubber and rubber-like solids, adding a latent vulcanizer and a latent accelerator thereto, dissolving the mixture in a suitable solvent, adding gums and plasticizers thereto, and dissolving from two to sixty per cent of a toxic copper compound therein.

2. The method of preparing a liquid coating composition comprising the steps of forming a milled mixture of about three parts rubber and one part rubber-like solids; forming a first master batch by milling one part of sulphur with nineteen parts of the said mixture; forming a second master batch by milling one part of zinc oxide with nineteen parts of said mixture; forming a base by milling approximately 2.5% of each master batch with ninety-five per cent of the milled rubber and rubber-like solids; dissolving the mixture thus obtained in three parts of solvent, adding small quantities of gums, and plasticizers, and dissolving therein from two to sixty per cent of a copper toxic.

CLARENCE L. HAUTHAWAY.